(12) United States Patent
Sugawara (10) Patent No.: US 6,854,677 B2
(45) Date of Patent: Feb. 15, 2005

(54) SPINNING-REEL SOUNDING MECHANISM (75) Inventor: Ken'ichi Sugawara, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 10/609,479

(22) Filed: Jul. 1, 2003

(65) Prior Publication Data

US 2004/0041045 A1 Mar. 4, 2004

(30) Foreign Application Priority Data

Aug. 27, 2002 (JP) ........................................ 2002-246462

(51) Int. Cl.[7] .............................................. A01K 89/00
(52) U.S. Cl. ..................................................... 242/307
(58) Field of Search ................................. 242/305–307

(56) References Cited

U.S. PATENT DOCUMENTS

| 4,163,528 | A | * | 8/1979 | Egasaki et al. | 242/300 |
|---|---|---|---|---|---|
| 4,173,317 | A | * | 11/1979 | Hamayasu et al. | 242/306 |
| 4,515,325 | A | * | 5/1985 | Ito | 242/295 |
| 4,548,367 | A | * | 10/1985 | Councilman | 242/306 |
| 5,022,606 | A | * | 6/1991 | Hashimoto | 242/307 |
| 5,279,477 | A | | 1/1994 | Yoshikawa | |
| 5,431,354 | A | | 7/1995 | Hitomi | |
| 5,857,632 | A | * | 1/1999 | Arkowski | 242/297 |
| 6,010,087 | A | * | 1/2000 | Merrill et al. | 242/318 |
| 6,056,223 | A | * | 5/2000 | Kirby | 242/306 |
| 6,189,822 | B1 | * | 2/2001 | Ikuta | 242/296 |
| 6,354,526 | B1 | * | 3/2002 | Morise | 242/295 |
| 2001/0030252 | A1 | | 10/2001 | Yamaguchi | |

FOREIGN PATENT DOCUMENTS

| EP | 1222855 A1 | 7/2002 |
|---|---|---|
| EP | 1234500 A2 | 8/2002 |
| EP | 1269838 A2 | 1/2003 |

* cited by examiner

Primary Examiner—Emmanuel Marcelo
(74) Attorney, Agent, or Firm—Shinjyu Global IP Counselors, LLP (57) ABSTRACT A sounding mechanism includes: a mount part mounted onto a rear end portion of a bobbin trunk portion and made of a synthetic resin; a disk member non-rotatably fastened to the spool shaft at the rear of the bobbin trunk portion; a pawl member mounted to the mount part so as to be relatively rotatable with the disk member; and a spring member fitted onto the mount part for urging the pawl member toward the disk member. By relative rotation between the spool and the spool shaft, the pawl member comes into contact with the disk member to produce sound. The mount part is made of a synthetic resin and is screw-fastened onto the rear end of the bobbin trunk portion by screws. The spinning-reel sounding mechanism allows reduction of the weight of the spool.

12 Claims, 6 Drawing Sheets

SPINNING-REEL SOUNDING MECHANISM

BACKGROUND OF THE INVENTION

1. Field of the Invention

This invention generally relates to spinning-reel sounding mechanisms. More specifically, the present invention relates to sounding mechanisms that produce sound when either the spool or spool shaft rotates relative to the other.

2. Background Information

Spinning reels are generally furnished with a reel body, which rotatably supports a handle, and with a rotor and a spool that is rotatably fitted onto the spool shaft. The spinning-reel spool moves reciprocatingly with respect to the reel body, and includes a bobbin trunk portion onto the outer circumference of which fishing line is wound, and a larger-diameter skirt portion provided at the rear end of the bobbin trunk portion. The bobbin trunk portion and the skirt portion are made of a metal and formed integrally by, for example, forging. Front drag type spinning reels are furnished with, in the interior thereof: a drag mechanism having a plurality of drag plates; a sounding mechanism for producing sound when the drag mechanism operates; and so forth.

This kind of sounding mechanism is furnished with a pawl member mounted at the rear of the bobbin trunk portion, and a disk member non-rotatably fastened on the spool shaft and on which a plurality of jags are formed to have intervals along its circumferential direction. The fore end of the pawl member repeatedly contacts with the fore ends of the jags by relative rotation between the bobbin trunk portion and the spool shaft. This kind of pawl member is fastened by fitting a pushnut or the like onto a pin member pressure-inserted into the rear end of the bobbin trunk portion.

The foregoing conventional spinning-reel sounding mechanism requires a thick wall portion inside the bobbin trunk portion, especially if the bobbin trunk portion is formed by forging, in order to pressure-insert the pin member for fitting the pawl member. When a thick wall portion is provided in the bobbin trunk portion in this way, the mass of the bobbin trunk portion increases, giving rise to the likelihood of preventing reduction in weight of the spool.

In view of the above, there exists a need for a spinning reel sounding mechanism which overcomes the above mentioned problems in the prior art. This invention addresses this need in the prior art as well as other needs, which will become apparent to those skilled in the art from this disclosure.

SUMMARY OF THE INVENTION

It is thus a purpose of the present invention to provide a spinning-reel sounding mechanism that allows reduction of the weight of the spool.

A spinning-reel sounding mechanism according to the first aspect of the invention is a spinning-reel sounding mechanism for producing sound by relative rotation between a spinning-reel spool shaft and a forged-metal spool, the spinning-reel sounding mechanism including: a mount part made of a synthetic resin and fitted on a rear end portion of the spool; a first sound-producing part fitted on the mount part; and a second sound-producing part fitted on the spool shaft, for producing sound by rotating relative to the first sound-producing part.

In this spinning-reel sounding mechanism, a mount part made of a synthetic resin is fitted onto the spool, which is formed by forging a metal. Because the mount part made of a synthetic resin is fitted, it is no longer necessary to provide the spool with a thick wall portion for pressure-inserting pin member as was conventionally necessary. Thus, the weight of the spool can be reduced.

A spinning-reel sounding mechanism according to the second aspect of the invention is the sounding mechanism of the first aspect, wherein the mount part is screw-fastened to the rear end of the spool. In this case, it is not necessary to provide a pin member to the spool in order to fit the mount part onto the spool. Therefore, the weight of the spool can be further reduced.

A sounding mechanism according to the third aspect of the invention is the sounding mechanism of the first or the second aspect, wherein the mount part is an arc-shaped member formed along the inner periphery of the spool. In this case, the mount part is arranged onto the spool within a small space.

A sounding mechanism according to the fourth aspect of the invention is the sounding mechanism of any one of the first through the third aspects, wherein: the first sound-producing part is a pawl member provided so as to be urged in a direction toward the second sound-producing part; and the second sound-producing part is a disk member disposed in a plane opposing the first sound-producing part and having a plurality of circumferentially-spaced jags colliding with the pawl member fore-endwise for producing sound. In this case, sound production is easily achieved with a simple construction.

A sounding mechanism according to the fifth aspect of the invention is the sounding mechanism of the fourth aspect, wherein the pawl member is urged by a spring member provided on the mount part. In this case, the pawl member can be made to contact with the jags repeatedly with an inexpensive configuration.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention is provided for illustration only, and not for the purpose of limiting the invention as defined by the appended claims and their equivalents.

Figure 1:
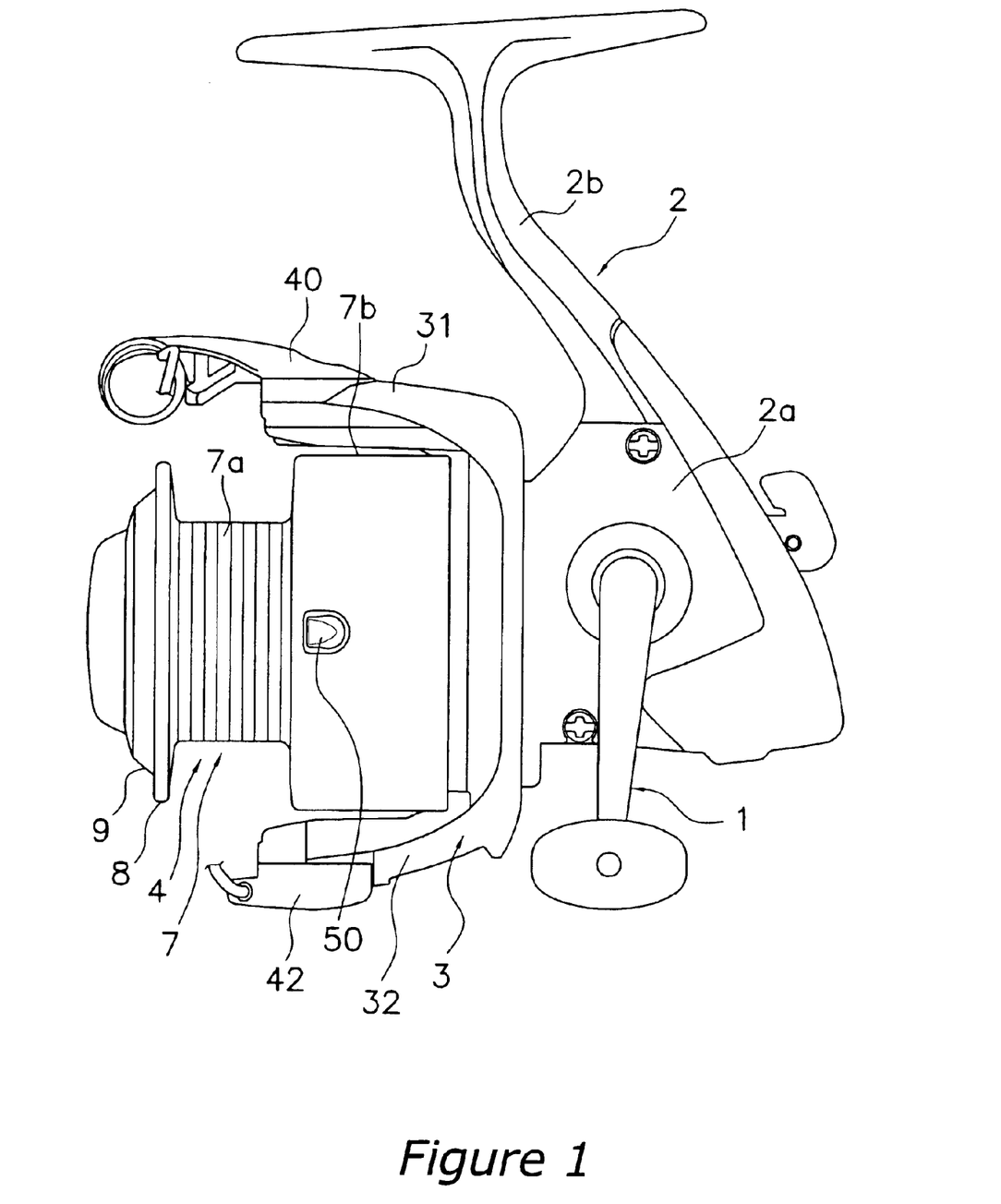
FIG. 1 is a left-side view of a spinning reel according to one embodiment of the present invention.

Referring initially to FIG. 1, a spinning reel is illustrated in accordance with a first embodiment of the present invention. The spinning reel in accordance with the embodiment of the present invention is, as shown in FIG. 1, a front drag type reel that is furnished with a reel body 2, which rotatably supports a handle 1, and with a rotor 3 and a spool 4. The rotor 3 is rotatably supported in front of the reel body 2. The spool 4 is for winding fishing line around its outer peripheral surface, and is disposed in front of the rotor 3 so as to be freely reciprocatable in the axial front-rear direction.

The reel body 2 includes a reel body 2a and a rod mounting leg 2b that extends diagonally up/frontward from the reel body 2a. The reel body 2a has a hollow in the interior thereof. Provided in the hollow are a rotor drive mechanism 5 for rotating the rotor 3 in cooperation with rotation of the handle 1, and an oscillating mechanism 6 for shifting the spool 4 back and forth to wind fishing line uniformly.

The rotor drive mechanism 5 includes a handle shaft 10 to which the handle 1 is fixedly coupled, a master gear 11 that rotates together with the handle shaft 10, and a pinion gear 12 that meshes with the master gear 11. The pinion gear 12 is formed into a cylindrical shape, and its front portion extends through the center of the rotor 3 and is fixedly coupled to the rotor 3 by a nut. The pinion gear 12 is rotatably supported by bearings on the reed body 2 at its intermediate portion and at its axial rear end.

The oscillating mechanism 6 is a mechanism for shifting back and forth a spool shaft 15 which is coupled to the center of the spool 4 through a drag mechanism 60, thereby shifting the spool 4 in the same front and rear directions. The oscillating mechanism 6 includes a worm shaft 21 disposed parallel to and below the spool shaft 15, a slider 22 that shifts back and forth along the worm shaft 21, and an intermediate gear 23 fastened onto the fore end of the worm shaft 21. The rear end of the spool shaft 15 is non-rotatably fastened to the slider 22. Rotation of the pinion gear 12 is transmitted to the intermediate gear 23 via a reduction gear, which is not shown in the figure.

Figure 2:
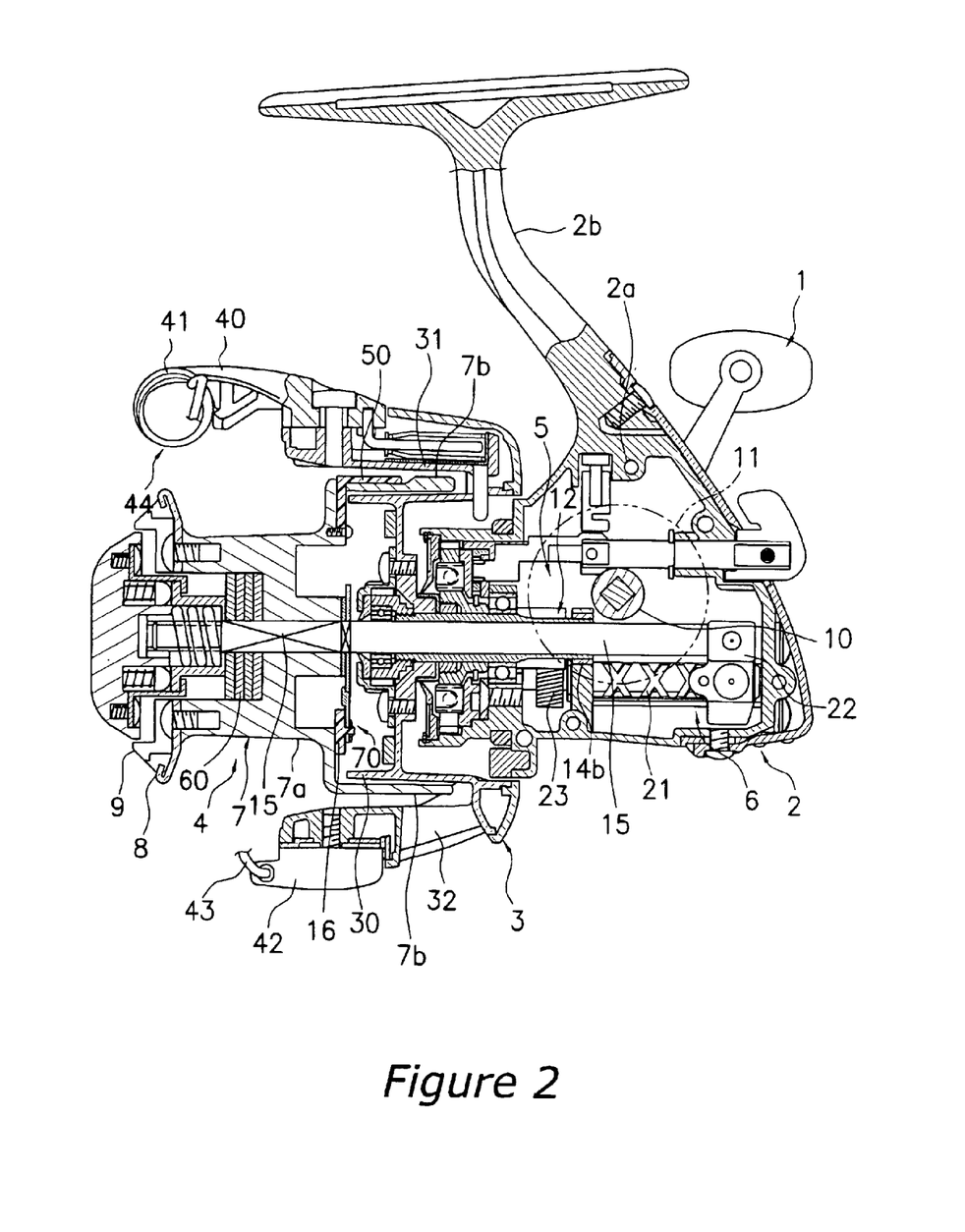
FIG. 2 is a cross-sectional side view of the spinning reel according to the embodiment of the present invention.

The rotor 3 includes, as shown in FIG. 2, a cylindrical portion 30, and a first rotor arm 31 and a second rotor arm 32 disposed at a side of the cylindrical portion 30 to oppose each other. The cylindrical portion 30, the first rotor arm 31, and the second rotor arm 32 are made of, for example, an aluminum alloy, and are integrally formed together.

The first rotor arm 31, curving in an outward bulge, extends frontward from the cylindrical portion 30. The part that is connected to the cylindrical portion 30 spreads and curves in the circumferential direction of the cylindrical portion 30. On the outer peripheral side of the fore end of the first rotor arm 31, a first bail-support member 40 is fitted pivotably. A line roller 41 for guiding fishing line to the spool 4 is also fitted to the fore end of the first bail-support member 40.

The second rotor arm 32, curving in an outward bulge, extends frontward from the cylindrical portion 30. The second rotor arm 32 branches into two legs from its fore end portion toward the part connected to the cylindrical portion 30, which are connected at two locations that are spaced at a circumferential interval. Onto the outer peripheral side of the fore end of the second rotor arm 3, a second bail-support member 42 is fitted pivotably.

A bail 43 made of wire bent into a substantially U shape is fastened between the line roller 41 and the second bail-support member 42. These first bail-support member 40, the second bail-support member 42, the line roller 41, and the bail 43 together make up a bail arm 44. The bail arm 44 is pivotably supported between the first and second arms 31 and 32, and guides fishing line onto the spool 4. The bail arm 44 freely pivots between a line-guiding posture, as indicated in FIG. 2, and a line-releasing posture, which is opposite therefrom.

Figure 3:
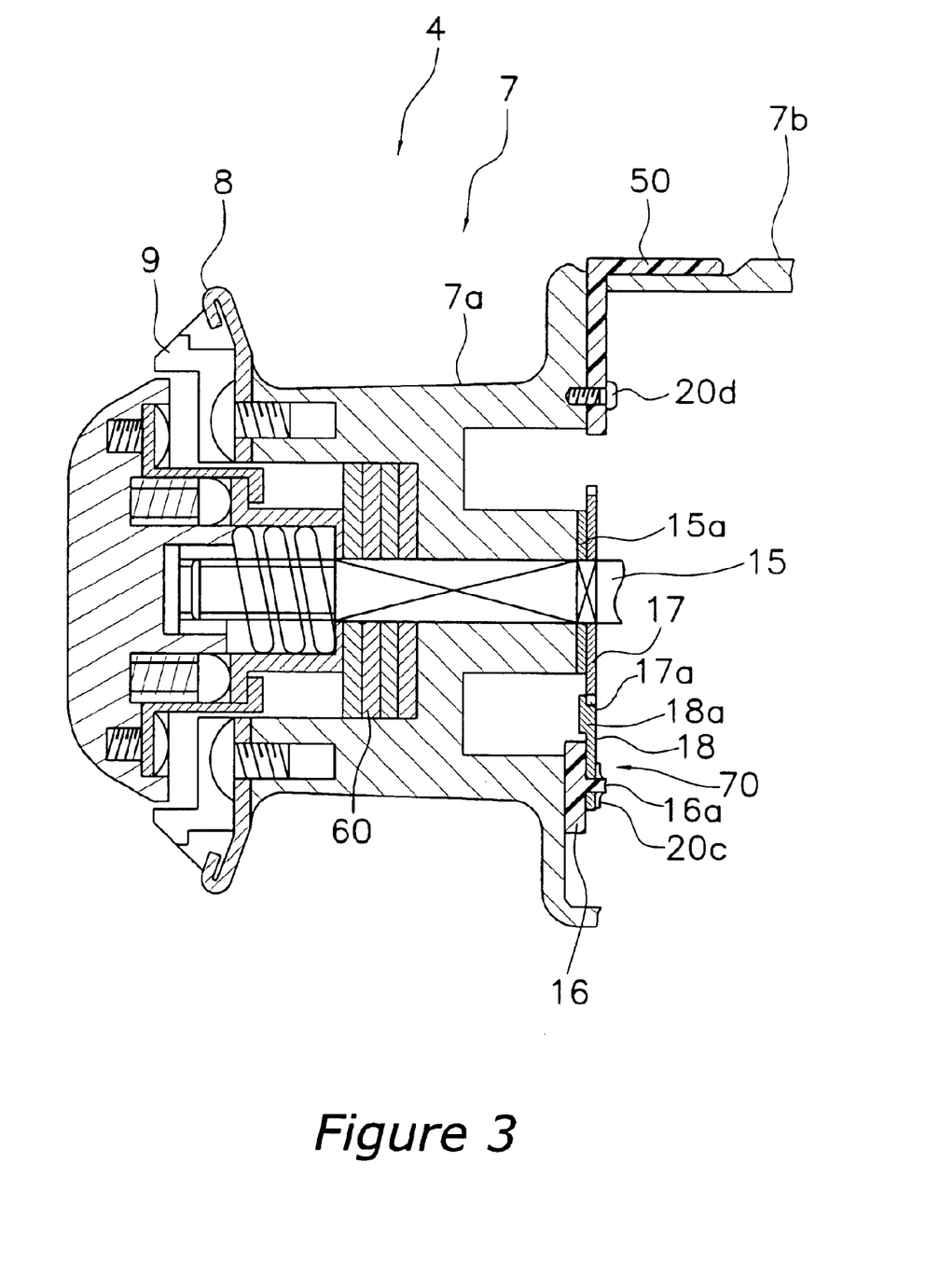
FIG. 3 is an enlarged cross-sectional view of the spool of the spinning reel according to the embodiment of the present invention.
Figure 4:
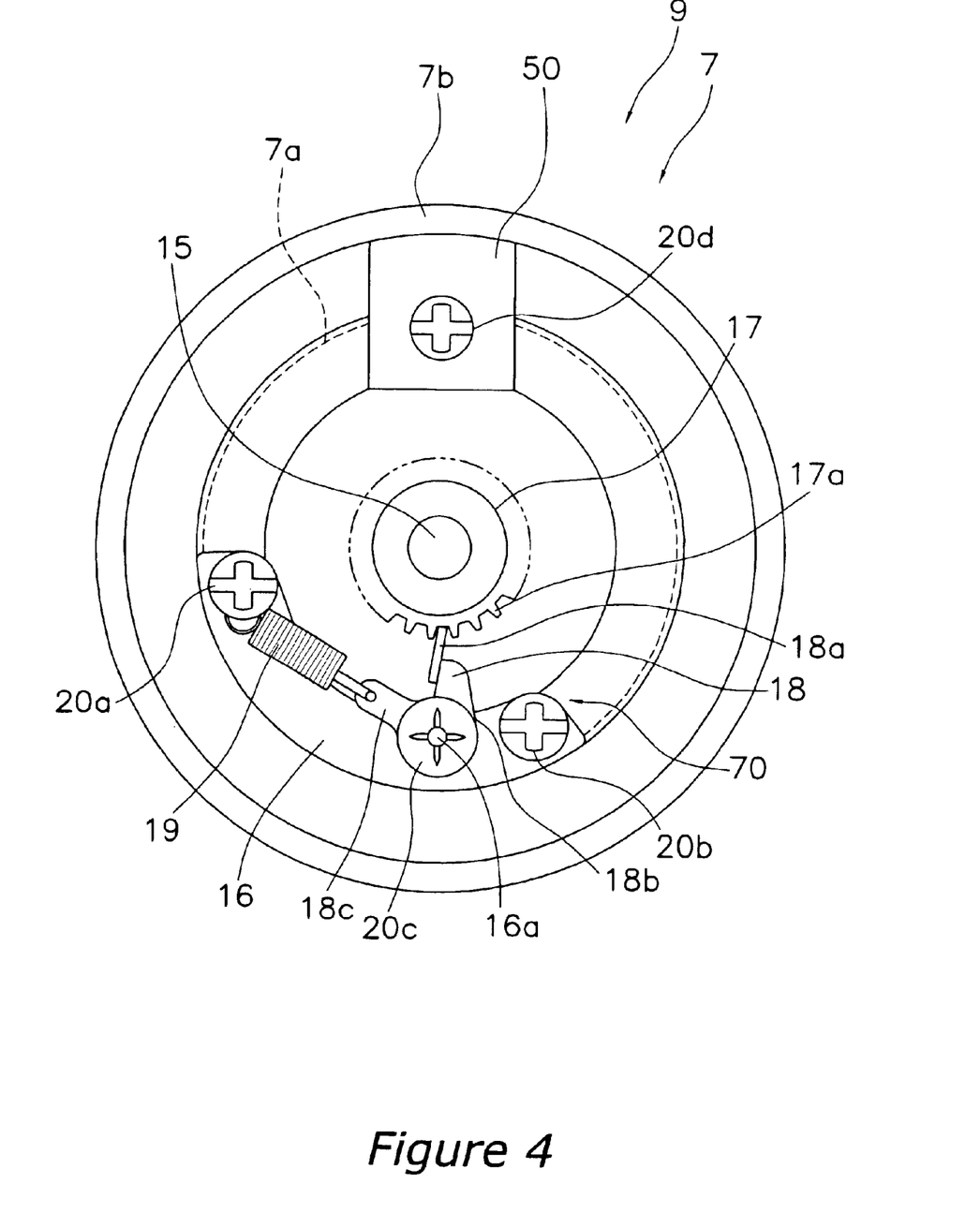
FIG. 4 is an enlarged cross-sectional view of a portion of the spool near a sounding mechanism according to the embodiment of the present invention.

The spool 4 is arranged between the first rotor arm 31 and the second rotor arm 32 of the rotor 3, and is fitted onto the fore end of the spool shaft 15 via the drag mechanism 60. The spool 4 includes, as shown in an enlarged view FIG. 3, a spool body 7, a large diameter front flange portion 8 attached onto the fore end of the spool body 7, and a front flange portion-fastening member 9 for fastening the front flange portion 8 onto the spool body 7. The spool body 7 is formed by forging a metal, and is furnished with a cylindrical bobbin trunk portion 7a onto the outer periphery of which fishing line is wound, and with a large diameter cylindrical skirt portion 7b integrally formed with the rear end of the bobbin trunk portion 7a. Onto the rear end of the bobbin trunk portion 7a, a fishing-line lock 50 for locking the foremost end of fishing line is fastened by a screw member 20d, as shown in FIGS. 3 and 4. On the rear end of the bobbin trunk portion 7a, a sounding mechanism 70 is attached that produces sound by relative rotation between the spool 4 and the spool shaft 15.

The sounding mechanism 70 includes, as shown in FIGS. 3 and 4, a mount part 16 fitted onto a rear end portion of the bobbin trunk portion 7a and made of a synthetic resin; a disk member 17 (an example of the second sound-producing portion) non-rotatably fastened to the spool shaft 15 on the rear end of the bobbin trunk portion 7a, a pawl member 18 (an example of the first sound-producing portion) fitted on the mount part 16 relatively rotatably with the disk member 17; and a spring member (an example of urging member) 19 fitted to the mount part 16 and urging the pawl member 18 toward the disk member 17 side. Herein, by the relative rotation between the spool 4 and the spool shaft 15, the pawl member 18 comes into contact with the disk member 17 to produce sound.

Figure 5:
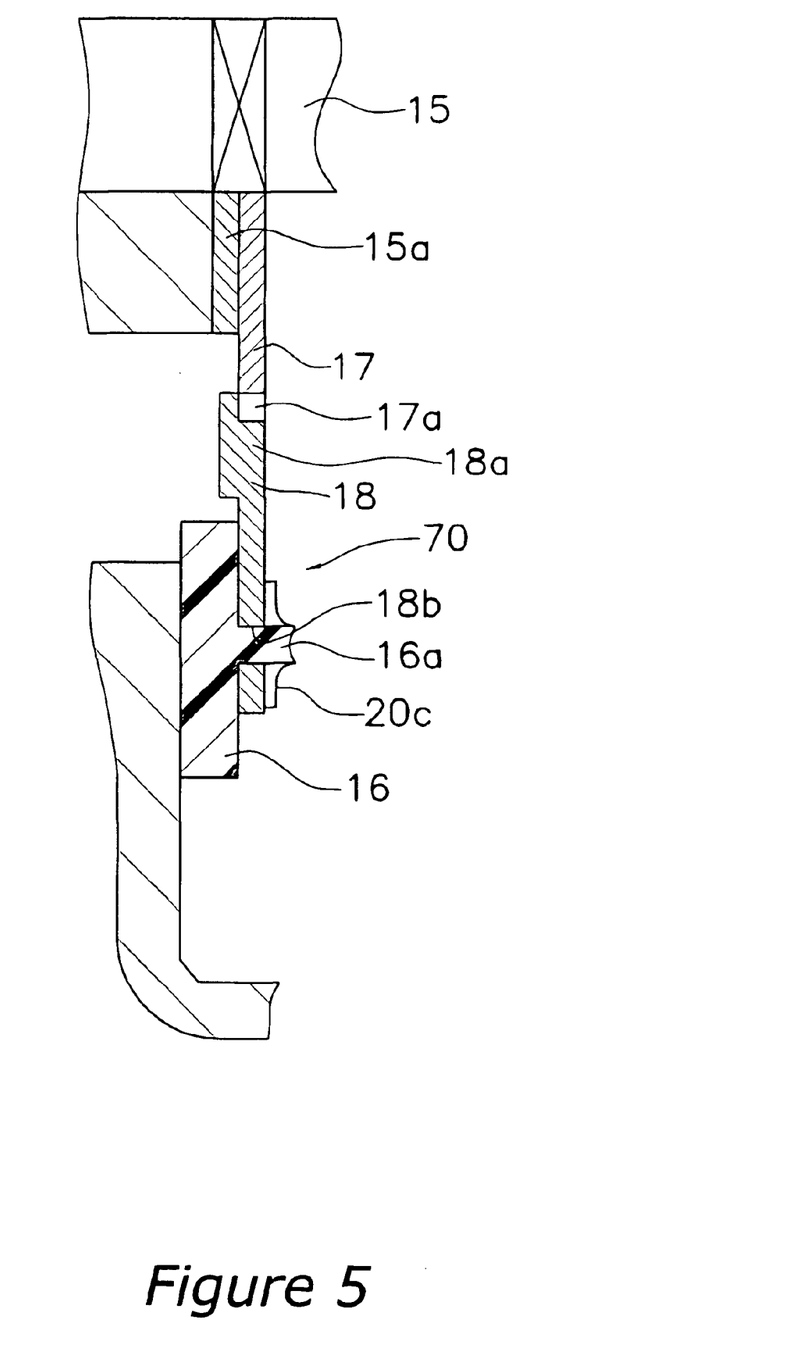
FIG. 5 is an enlarged cross-sectional view of a portion of the sounding mechanism near a pushnut, according to the embodiment of the present invention.
Figure 6:
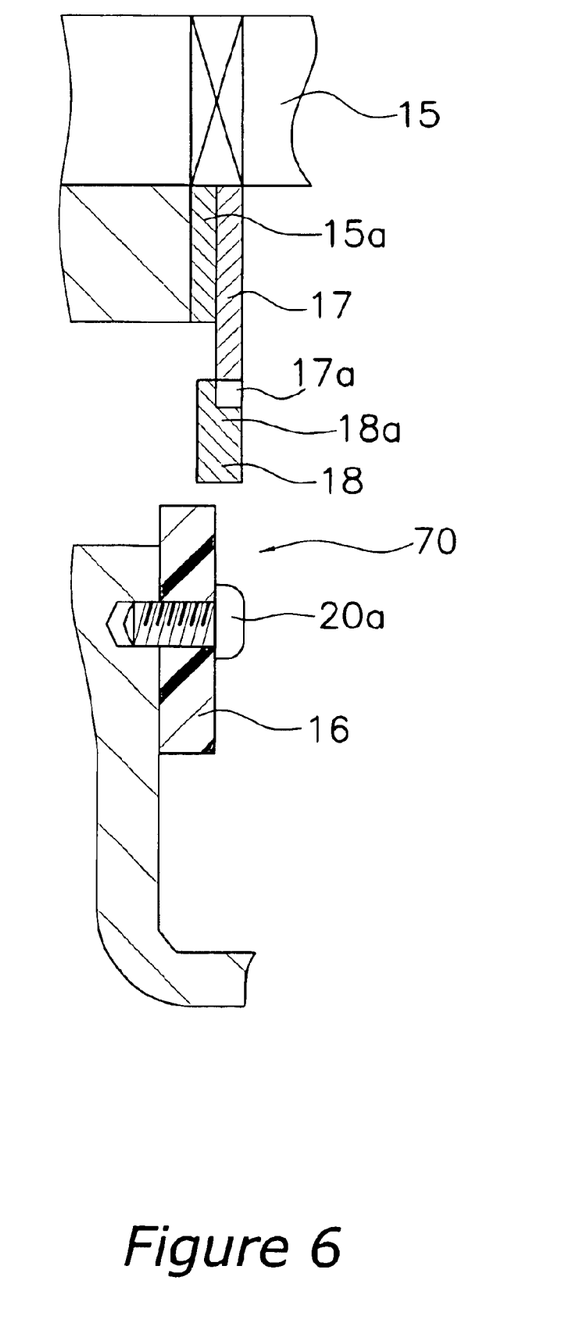
FIG. 6 is an enlarged cross-sectional view of a portion near a screw member of the sounding mechanism according to the embodiment of the present invention.

The mount part 16 is, as shown in FIGS. 3 through 6, an arc-shaped member that is formed along the inner periphery of the rear end of the bobbin trunk portion 7a and is made of a synthetic resin. Both ends of the mount part 16 are, as shown in FIGS. 4 and 6, screw-fastened by screw members 20a and 20b onto the rear end of the bobbin trunk portion 7a. At the center of the mount part 16, a boss portion 16a for fitting the pawl member 18 pivotably is elevated, as shown in FIGS. 3 through 5. The pawl member 18 is fastened to the boss portion 16a by a pushnut 20c.

The disk member 17 is, as shown in FIG. 3 through FIG. 6, fastened non-rotatably to the spool shaft 15 so that the disk member 17 comes into contact with the spool shaft 15 of the bobbin trunk portion 7a with a washer 15a that is interposed. The disk member 17 functions as a spool retainer for preventing the bobbin trunk portion 7a from moving rearward. The disk member 17 is disposed on a surface opposing the pawl member 18, and is furnished with a plurality of jags 17a formed to have intervals along its circumferential direction. Herein, by relative rotation between the spool 4 and the spool shaft 15, the fore end of the pawl member 18 repeatedly comes into contact with the jags 17a to produce sound.

The pawl member 18 is, as shown in FIGS. 3 and 4, a member that is provided to freely move toward and away from the disk member 17, and is urged toward the disk member 17 to make contact with the jags 17a in order to produce sound. Herein, when the drag mechanism 60 is operated and an inner barrel member 7d is rotated, the pawl member 18 fitted on the inner barrel member 7d rotates and comes into contact with the jags 17a on the disk member 17 to produce sound. The pawl member 18 is a substantially hook-shaped member made of a metal, and is furnished with: a pawl part 18a for contacting the jags 17a on the disk member 17, a mounting portion 18b mounted to the boss portion 16a of the mount part 16, and a locking portion 18c (see FIG. 4) that is provided at the opposite side to the pawl part 18a with the mounting portion 18b interposed therebetween. The spring member 19 is locked onto the locking portion 18c. The pawl member 18 is fastened to the boss portion 16a of the mount part 16 by the pushnut 20c.

As shown in FIG. 4, one end of the spring member 19 is fastened to the mount part 16 by a screw member 20a and the other end is locked to the lock portion 18c of the pawl member 18. Herein, the pawl member 18 is urged by the spring member 19 in a direction opposite the rotational direction of the disk member 17. In this manner, the pawl member 18 comes into contact with the disk member 17 by relative rotation between the spool 4 and the spool shaft 15 to produce sound.

Next, handling and operation of the reel is explained in more detail.

When casting, the rotor 3 is set to a reverse-rotation prohibited state, and the bail arm 44 is grasped by the hand to flip over the bail arm 44 to the line-releasing posture. When the bail arm 44 is in the line-releasing posture, it is possible to reel out fishing line easily from the spool 4.

After the casting, when the handle 1 is rotated in the line reel-in direction while the bail arm 44 is still maintained in the line-releasing posture, the rotor 3 is rotated by the rotor drive mechanism 5 in the line reel-in direction. When the rotor 3 is rotated in the line reel-in direction, the bail arm 44 is returned in the line-guiding posture. At this time, if a fish drags fishing line with a large force, the drag mechanism 60 operates and the spool 4 rotates relative to the spool shaft 15. When the spool 4 thus rotates relative to the spool shaft 15, the pawl member 18 repeatedly comes into contact with the disk member 17, thereby producing sound.

The sounding mechanism 70 has the mount part 16 made of a synthetic resin, which is mounted to the bobbin trunk portion 7a which is made by forging a metal. Herein, because the mount part 16 made of a synthetic resin is mounted to the bobbin trunk portion 7a, it is no longer necessary to provide the bobbin trunk portion 7a with a thick wall portion for pressure-inserting a pin member, as was the case in the prior art. Therefore, reduction in the weight of the spool 4 is possible.

Other Embodiments (a) In the foregoing embodiment, the bobbin trunk portion 7a was integrally formed with the skirt portion 7b, but bobbin trunk portion 7a and the skirt portion 7b may be formed separately if the bobbin trunk portion 7a is formed by forging.

(b) In the foregoing embodiment, the fishing-line lock 50 was fastened by the screw member 20d, but it may be fastened by, for example, a pushnut or the like.

(c) In the foregoing embodiment, the pawl member 18 was a substantially hook-shaped member made of a metal, but the invention is not limited to such shape and material. For example, the pawl member may have a tongue-like shape. Also, the pawl member may be an elastic member made of a synthetic resin.

According to the present invention, the weight of the spool is reduced since the mount part fitted onto the spool, which is formed by forging a metal, is made of a synthetic resin.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

The terms of degree such as "substantially", "about" and "approximately" as end result is not significantly changed. These terms should be construed as including used herein mean a reasonable amount of deviation of the modified term such that a deviation of at least ±5% of the modified term if this deviation would not negate the meaning of the word it modifies.

This application claims priority to Japanese Patent Application No. 2002-246462. The entire disclosure of Japanese Patent Application No. 2002-246462 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. A sounding mechanism for producing sound by relative rotation between a spool shaft and forged-metal spool, the sounding mechanism comprising:

a mount part made of a synthetic resin and fitted on a rear end portion of the spool;

a first sound-producing part fitted on said mount part; and a second sound-producing part fitted on the spool shaft, said second sound-producing part producing sound by rotating relative to said first sound-producing part.

2. The sounding mechanism as set forth in claim 1, wherein said part is screw-fastened to the rear end portion of the spool.

3. The sounding mechanism as set forth in claim 1, wherein said mount part is an arc-shaped member disposed along an inner periphery of the spool.

4. The sounding mechanism as set forth in claim 1, wherein:

said first sound-producing part includes a pawl member and an urging member that is provided to urge said pawl member in a direction toward said second sound-producing part; and said second sound-producing part includes a disk member that is disposed opposite said first sound-producing part, said disk member having a plurality of circumferentially-spaced jags for producing sound by repeatedly colliding with said pawl member.

5. The sounding mechanism as set forth in claim 4, wherein said urging member is a spring member provided on said mount part.

6. The sounding mechanism as set forth in claim 4, wherein said mount part has a boss portion, and said pawl member is pivotably fitted to said boss portion of said mount part.

7. A spinning reel, comprising:

a handle;

a reel body that rotatably supports said handle;

a rotor rotatably supported in front of said reel body;

a spool for winding fishing line around its outer peripheral surface, said spool being disposed in front of said rotor so as to be freely reciprocatable along a spool shaft in a front-rear direction, said spool including a spool body having a cylindrical bobbin trunk portion onto an outer periphery of which the fishing line is wound, and a skirt portion integrally formed with a rear end of said bobbin trunk portion; and a sounding mechanism for producing sound by relative rotation between said spool and the spool shaft; said sounding mechanism including a mount part made of a synthetic resin and fitted unrotatably on rear end portion of said spool body, a first sound-producing part fitted on said mount part; and a second sound-producing part fitted on the spool shaft, said second sound-producing part producing sound by rotating relative to said first sound-producing part.

8. The spinning reel as set forth in claim 7, wherein said mount part is screw-fastened to the rear end portion of the spool.

9. The spinning reel as set forth in claim 7, wherein said mount part is an arc-shaped member disposed along an inner periphery of said spool body.

10. The spinning reel as set forth in claim 7, wherein:

said first sound-producing part includes a pawl member and an urging member that is provided to urge said pawl member in a direction toward said second sound-producing part; and said second sound-producing part includes a disk member that is disposed opposite said first sound-producing part, said disk member having a plurality of circumferentially-spaced jags for producing sound by repeatedly colliding with said pawl member.

11. The spinning reel as set forth in claim 10, wherein said urging member is a spring member provided on said mount part.

12. The spinning reel as set forth in claim 10, wherein said mount part has a boss portion, and said pawl member is pivotably fitted to said boss portion of said mount part.

* * * * *